No. 635,311. Patented Oct. 24, 1899.
T. M. FLOWER.
COLLAPSIBLE CORE FOR MANUFACTURING GLASS CONDUITS.
(Application filed May 19, 1899.)
(No Model.) 2 Sheets—Sheet 1.
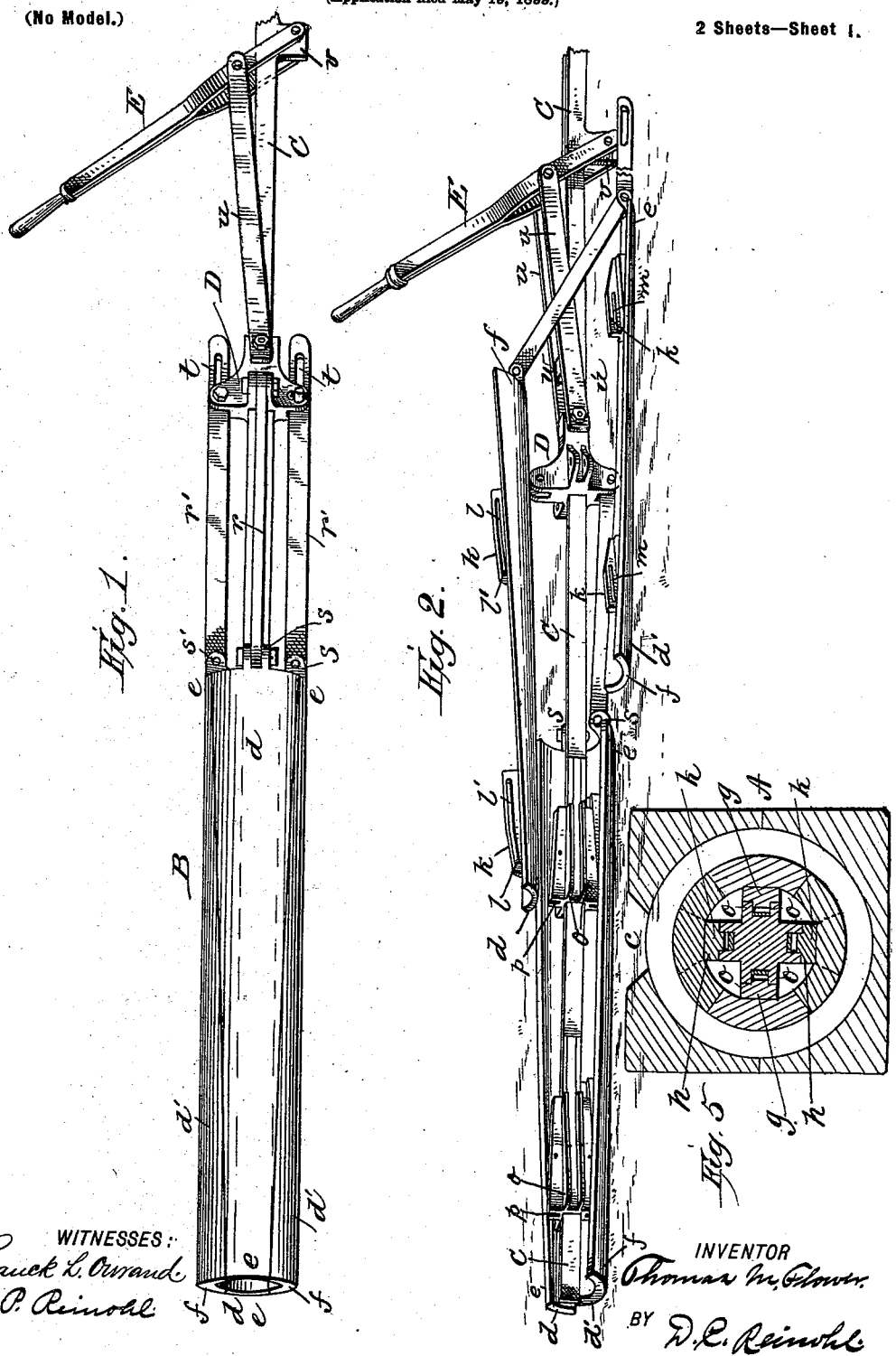
WITNESSES:
INVENTOR
Thomas M. Flower
BY
ATTORNEY No. 635,311. Patented Oct. 24, 1899.
T. M. FLOWER.
COLLAPSIBLE CORE FOR MANUFACTURING GLASS CONDUITS.
(Application filed May 19, 1899.)
(No Model.) 2 Sheets—Sheet 2.
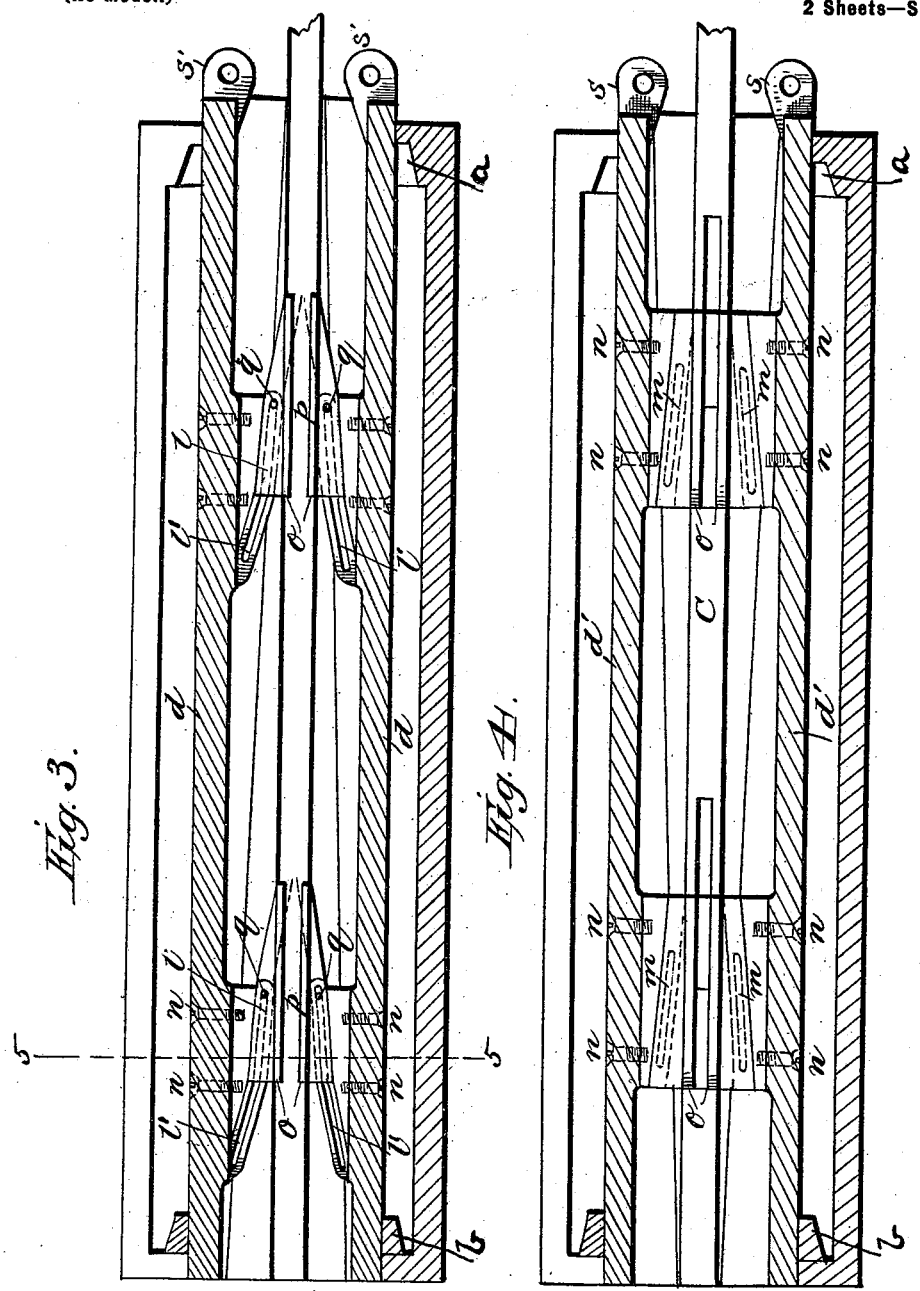

UNITED STATES PATENT OFFICE.

THOMAS M. FLOWER, OF BRIDGETON, NEW JERSEY, ASSIGNOR, BY MESNE ASSIGNMENTS, TO STEPHEN JONES, TRUSTEE, OF SCRANTON, PENNSYLVANIA.

COLLAPSIBLE CORE FOR MANUFACTURING GLASS CONDUITS.

SPECIFICATION forming part of Letters Patent No. 635,311, dated October 24, 1899.

Application filed May 19, 1899. Serial No. 717,446. (No model.)

*To all whom it may concern:*

Be it known that I, THOMAS M. FLOWER, a citizen of the United States, residing at Bridgeton, in the county of Cumberland and State of New Jersey, have invented certain new and useful Improvements in Collapsible Cores for the Manufacture of Glass Conduits; and I do hereby declare the following to be a full, clear, and exact description of the invention, such as will enable others skilled in the art to which it appertains to make and use the same.

My invention relates to the manufacture of glass conduits for electrical conductors and other purposes to which such conduits may be applied, and has especial reference to collapsible cores used in casting the conduits; and it consists in certain improvements in construction which will be fully disclosed in the following specification and claims.

In the accompanying drawings, which form part of this specification, Figure 1 represents a side elevation of the core assembled for insertion in a mold; Fig. 2, a perspective of the same, showing the segments separated; Fig. 3, a vertical longitudinal section of the mold and the core; Fig. 4, a like view taken at a right angle to Fig. 3, and Fig. 5 a transverse section on line 5 5 on Fig. 3.

Reference being had to the drawings and the letters thereon, A indicates the mold, made in two parts separable horizontally in the usual manner of constructing molds for casting articles, is provided with an annular recess $a$ at one end to form the spigot end of pipe and with a collar $b$ at the opposite end to form the bill end of the pipe, and an opening $c$ in the upper section of the mold, through which molten glass is poured into the mold, the surplus glass remaining in the opening $c$ after the mold has been filled being removed in the usual manner well known to those skilled in the art.

The core B is made in four segments or staves $d\ d\ d'\ d'$ to form a complete cylinder when assembled. The segments $d$ and $d'$ are tapered on a helical curve, as shown in Figs. 1 and 2, and assembled alternately, with the narrow ends $e$ and the broad ends $f$ of the segments at opposite ends of the core, which causes the segments to slide readily with a very slight degree of collapse or retraction and free or disengage themselves from the pipe surrounding the core. Each segment is provided with elongated shoes $g\ h$, having tongues $k$. The tongues on the shoes of the segments $d$ are provided with slots $l$, slightly inclined, and slots $l'$, having a more acute angle, and the tongues on the shoes of the segments $d'$ are provided with an inclined slot $m$, the shoes being secured to the segments by screws $n$.

C indicates a spindle on which are formed radial projections $o\ o\ o\ o$ on opposite sides of the spindle and at right angles to each other and taper toward the lever end of the spindle and are provided with grooves $p$, in which the tongues of the shoes slide and are held in engagement with the projection by cotter-pins $q$, extending through the projections and the slot in the tongue to slide freely in the groove as the segments $d\ d'$ are contracted and expanded. The spindle C extends beyond the segments and is provided with a cross-head D, which is connected to the segments by links $r\ r'$, which engage lugs $s\ s'$ on the segments, the links $r'$ being provided with elongated slots $t$ for the purpose of allowing the segments $d$ to be moved in advance of the segments $d'$ for contracting the core. From the cross-head extends links $u$, which connect the cross-head to a lever E, whose lower end is fulcrumed in a lug $v$, depending from the spindle C, to reciprocate the cross-head on the spindle and contract and expand the core by drawing the segments $d\ d'$ toward the lever to contract the core and by pushing or projecting them therefrom to expand the core. The outward movement of the cross-head is limited by the stop $w$ on the spindle.

The operation is as follows: The glass having been poured into the mold around the core and allowed to stand a sufficient length of time to set, the lever E is moved outward, drawing the cross-head in the direction of the lever, and the links $r$ draw the segments $d$ in the same direction a distance of three inches, during which movement the inclined slots $l$ in the tongues of the shoes have contracted said segments one-eighth of an inch, when a further movement of the lever draws the four segments synchronously three inches more, during which movement the slots $l'$ and $m$ in the tongues have contracted the segments so that each segment has been drawn in toward the spindle one-fourth of an inch, producing a reduction of one-half an inch in the diameter of the core, when it can be readily removed from the core and the surrounding section of a pipe or conduit.

Having thus fully described my invention, what I claim is—

1. A core composed of tapering segments of a circle arranged oppositely as described and provided with tongues having inclined slots, in combination with a spindle having grooves thereon engaged by said tongues, a cross-head longitudinally movable on said spindle, and means for contracting and expanding the core.

2. A core composed of segments of a circle tapering in opposite directions as described, a spindle to which the segments are connected, a cross-head longitudinally movable on the spindle and links of different lengths connecting the segments to the cross-head, in combination with a lever for operating the cross-head.

3. A core composed of segments of a circle tapering in opposite directions as described and provided with tongues having slots in one set of the same angle of inclination, and the slots in the other set of two different angles of inclination; in combination with a spindle having grooves therein engaged by said tongues, a cross-head longitudinally movable on the spindle, links of different lengths connecting the segments to the cross-head, a lever fulcrumed on said spindle and links connecting the cross-head to the lever.

In testimony whereof I affix my signature in presence of two witnesses.

THOMAS M. FLOWER.

Witnesses:
THOMAS W. TRENCHARD,
REX A. DONNELLY.